(No Model.)

C. R. MEAD.
ANIMAL TRAP.

No. 529,129. Patented Nov. 13, 1894.

WITNESSES:
J. J. Laass
C. L. Bendixon

INVENTOR.
Charles R. Mead
By E. Laass
his ATTORNEY

UNITED STATES PATENT OFFICE.

CHARLES R. MEAD, OF ONEIDA, NEW YORK.

ANIMAL-TRAP.

SPECIFICATION forming part of Letters Patent No. 529,129, dated November 13, 1894.

Application filed March 5, 1894. Serial No. 502,317. (No model.)

*To all whom it may concern:*

Be it known that I, CHARLES R. MEAD, of Oneida, in the county of Madison, in the State of New York, have invented new and useful Improvements in Animal-Traps, of which the following, taken in connection with the accompanying drawings, is a full, clear, and exact description.

This invention relates to the class of animal traps in which two gripping jaws are pivoted to a base and actuated by a spring which closes the jaws to grip and entrap the animal, a latch engages one of the jaws to hold the trap in its open or set position and a pivoted bait-pan causes the said latch to release the jaw when said pan is disturbed by the animal attracted to the trap by the bait placed upon the pan.

My present invention consists in an improved construction of the aforesaid latch and its connection with the bait-pan as hereinafter described and specifically set forth in the claims.

Figure 1:
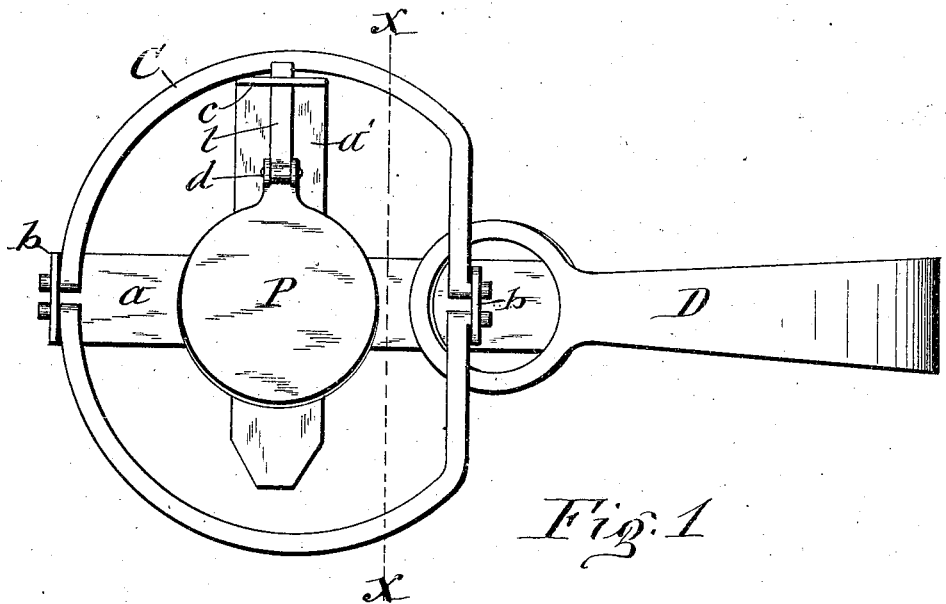
Figure 3:
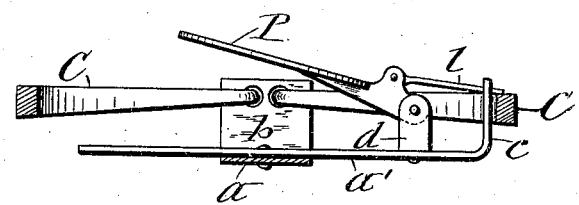
Figure 2:
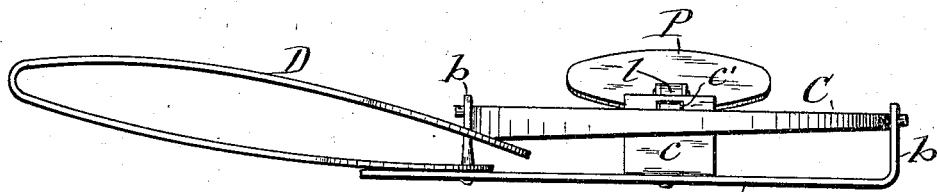

In the annexed drawings Figures 1 and 2 are respectively plan and side views of an animal trap embodying my invention, and Fig. 3 is a transverse section on line —X—X— in Fig. 1.

—a— and —a'— denotes the base of the trap, which base is usually formed of two flat metal bars secured at right angles to each other. From the bar —a— rise two ears —b—b— to which the jaws —C—C— are pivoted, and —D— is the spring which is of the usual loop-shape and connected to one of the aforesaid ears to actuate the jaws in the usual manner. The other bar —a'— terminates with a secondary post —c— which is back of the heel of the bait pan provided with an aperture —c'— as best seen in Fig. 2 of the drawings.

—P— represents the bait-pan which is pivoted to a post —d— secured to the bar —a'— as more clearly shown in Fig. 3 of the drawings, and —l— represents the latch which retains the trap in its set condition. This latch passes with one of its ends through the aperture —c'— and engages the adjacent jaw —C— so as to confine the same in its open position, and is drawn out of said engagement by a disturbance of the bait-pan. Said passage of the latch through the aperture —c'— in engaging the jaw forms a most positive, safe and durable lock and constitutes the salient features of my invention. Said latch may be connected to the bait-pan in any suitable manner to be moved thereby longitudinally into and out of engagement with the jaw. This in combination with the secondary post —c— holding the latch in its locking position on the jaw constitutes the salient features of my invention. I preferably however pivot said latch to the shank of the bait-pan as clearly shown in Fig. 3 of the drawings.

It will be observed that by depressing the bait-pan, the latch is drawn out of its engagement with the top of the jaw. The latter being thus released allows the spring —D— to close the trap.

What I claim as my invention is—

1. In combination with the base, spring-actuated jaws, a bait-pan pivoted on said base, a latch connected to the bait-pan, to be moved longitudinally thereby, and a post back of the heel of the bait-pan holding the latch in engagement with one of the jaws as set forth.

2. In combination with the base, bait-pan pivoted thereon and spring-actuated jaws, a post rising from the base and provided with an aperture, and a latch pivoted to the shank of the bait-pan and passing through said aperture and retaining the adjacent jaw in its open position substantially as set forth and shown.

In testimony whereof I have hereunto signed my name this 28th day of February, 1894.

CHARLES R. MEAD. [L. S.]

Witnesses:
J. T. DURHAM,
H. N. STERLING.